Patented Aug. 18, 1931

1,819,014

UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW VAT DYESTUFFS OF THE DIANTHRAQUINONYLAMINE-CARBAZOLE SERIES

No Drawing. Application filed April 4, 1930, Serial No. 441,705, and in Germany April 9, 1929.

The present invention relates to new vat dyestuffs of the dianthraquinonylamine-carbazole series.

I have found that valuable vat dyestuffs are obtainable by introducing into the amino groups of alpha-amino-, or alpha-alpha-diamino-1.1'-dianthraquinonylamine-carbazoles one or two residues of an anthraquinone-β-carboxylic acid.

The manufacture of my new dyestuffs may be performed according to various methods. For example, the alpha-amino-, or alpha-alpha-diamino-1.1'-dianthraquinonylamine-carbazoles, which may be further substituted by monovalent substituents, such as aroylamino-, hydroxy-, alkoxy groups or the like, are caused to react with an anthraquinone-β-carboxylic acid halogenide or a substitution product thereof, such as hydroxy-, alkoxy-, alkylthioether - anthraquinone - 2 - carboxlic acid halogenides or the like, in the presence of a suitable high boiling organic solvent, such as nitrobenzene, at a temperature of about 150° C. This method generally yields the new dyestuffs in a simple manner and in a good state of purity. In some cases, however, another process of manufacture may be more advantageous; for example, 4.4'-diamino-1.1'-dianthraquinonylamine- may first be condensed with an anthraquinone-β-carboxylic acid halide, carbazole ring formation of the intermediate product thus obtainable then being performed by heating with strong sulfuric acid. Furthermore, my new products may be prepared by condensing an anthraquinone-β-carboxylic acid halide with an alpha-halogen-alpha-amino-anthraquinone, causing the reaction product to be reacted upon by an alpha-aminoanthraquinone in the present of a high boiling organic solvent, such as naphthalene, and of copper and an acid binding medium and performing carbazole ring closure of the dianthraquinonylamine thus formed with aluminum chloride and pyridine. In an analagous manner α-benzoylamino-β-anthraquinoly-α-amino 1.1'- dianthraquinonylamine carbazoles can be prepared by condensing an alpha-benzoylamino-alpha-halogen anthraquinone with an alpha-alpha-diamino-anthraquinone, one amino group of which is substituted by the residue of an anthraquinone-β-carboxylic acid, or vice versa by condensing an alpha-alpha-benzoylamino-aminoanthraquinone with a β-anthraquinoyl-alpha-amino-alpha-halogen anthraquinone and treating the reaction products with strong sulfuric acid to cause carbazole ring formation.

It may be mentioned that the methods given above for the preparation of my new dyestuffs are not the only ones possible, but that their manufacture may be performed according to any other method known for the preparation of acylamino-dianthraquinonylamine-carbazoles.

The new dyestuffs probably correspond to the general formula:

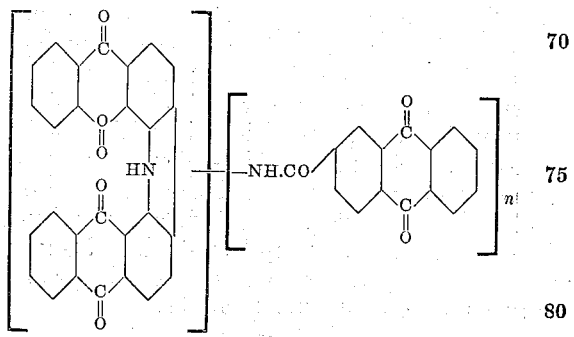

wherein $n$ means one of the numbers 1 or 2, the —NH— group being linked to an alpha-position of the dianthraquinonylamine-carbazole nucleus, and wherein the different anthraquinone nuclei may be further substituted by monovalent substituents. They form red to black powders insoluble in alcohol, toluene, pyridine and the like, partly soluble in large quantities of hot quinoline. They dissolve easily in strong sulfuric acid with red to blue colorations and dye cotton from an alkaline hydrosulfite vat strong orange to olive-green shades of good fastness properties.

In comparison to the corresponding known benzoylamino - dianthraquinonylamine - carbazoles, my new products show the advantage that they dye lighter shades which are almost waterproof, and yield vats with comparative ease. As especially valuable in view of their dyeing properties have been found those of my new dyestuffs which contain the anthraquinone-β-carboxylic acid residues twice in the molecule, or those which contain one anthraquinone-β-carboxylic acid residue and one benzoyl residue in the molecule.

The following examples illustrate my invention without limiting it thereto, the parts being by weight.

Example 1

6 parts of anthraquinone-β-carboxylic acid are suspended in 50 parts of dry nitrobenzene, 4 parts of thionylchloride are added and the mixture is heated to 100–120° C. while stirring for about 1 hour. Hereafter the excess of thionylchloride is distilled off by heating to about 150°C., 4.5 parts of finely divided 4.4'-diamino-1.1'-dianthraquinonylamine are added and the mixture heated to 150–160° C. for 3 hours.

As soon as no more unchanged starting material is present, the reaction mixture is cooled to about 100° C. and filtered at this temperature. A bluish-grey intermediate product is thus obtained difficultly soluble in the usual organic solvents, easily soluble in strong sulfuric acid with a green coloration. It dyes cotton from an alkaline hydrosulfite vat grey shades.

This intermediate product is dissolved in sulfuric acid of 96% strength and heated to 25–30° C. until the solution has become brown. By pouring the solution into water containing chromic acid or another oxidizing agent, olive-green flakes are obtained, which dissolve in strong sulfuric acid with a reddish-brown coloration. The new product is almost insoluble in the usual organic solvents and dyes cotton from a brown alkaline hydrosulfite vat yellowish-olive shades of good fastness properties also to water. It probably corresponds to the formula:

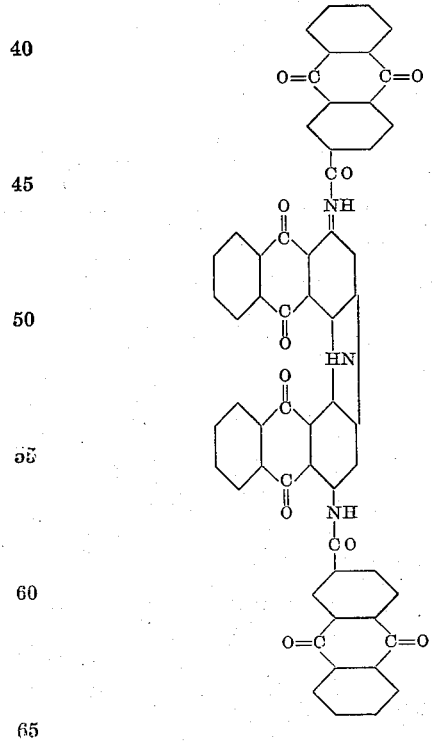

Example 2

10 parts of 5.5'-diamino-1.1'-dianthraquinonylamine-carbazole (obtainable by saponification of the corresponding 5.5'-dibenzoylamino compound) are introduced into 200 parts of nitrobenzene and the mixture is heated to 150° C. until the water contained in the nitrobenzene has evaporated. Hereafter 12.5 parts of anthraquinone-2-carboxylic acid chloride are introduced at about 120° C., the reaction mixture heated to 150–160° C. for about 2 hours and filtered by suction while still hot. There remains on the filter an orange-yellow powder, dissolving in boiling quinoline with the same coloration, in strong sulfuric acid with a blue coloration. It dyes cotton from a brown hydrosulfite vat orange-yellow shades of good fastness properties. It probably corresponds to the formula:

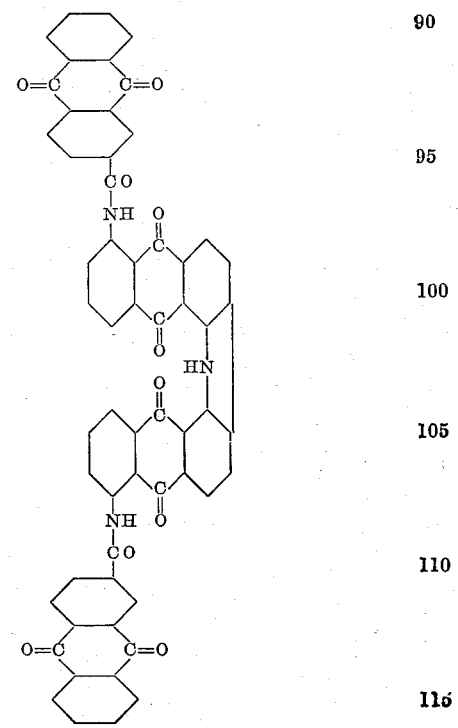

Example 3

7.5 parts of 1-benzoylamino-4-aminoanthraquinone, 10 parts of 1'-hydroxy-anthraquinone-2'-carboxylic acid-(5-chloroanthraquinonyl-1)-amide, 7 parts of water-free sodium acetate and 0.3 part of copper powder are boiled together with 300 parts of naphthalene until a sample dissolved in pyridine no longer changes its color. The reaction product can be separated by dilution with pyridine, filtering by suction and washing.

The isolated product is then transformed into the corresponding carbazole derivative, as described in Example 1. It forms a brown powder dissolving in hot quinoline with a brown, in sulfuric acid of 96% strength with a reddish-brown coloration and dyes cotton from a brown hydrosulfite vat brown shades which are not fast to alkali. By etherification of the dyestuff in the usual manner, for instance, by means of dimethyl sulfate this disadvantage can be overcome. The new dyestuff probably corresponds to the formula:

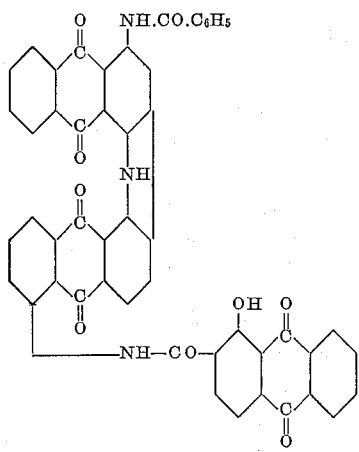

I claim:—
1. The products of the probable general formula:—

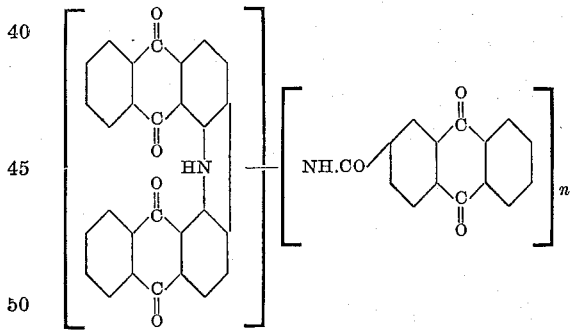

wherein $n$ means one of the numbers 1 or 2, the —NH— group being linked to an alpha-position of the dianthraquinonylamine-carbazole nucleus, and wherein the different anthraquinone nuclei may be further substituted by monovalent substituents, said products forming red to black powders insoluble in alcohol, toluene and pyridine, soluble in strong sulfuric acid with red to blue colorations, dyeing cotton from an alkaline hydrosulfite vat strong orange to olive-green shades of good fastness properties.

2. The product of the probable formula:

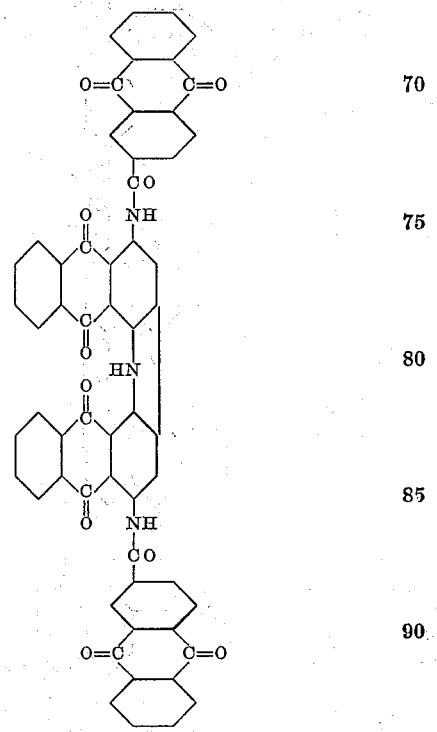

said product forming olive-green flakes dissolving in strong sulfuric acid with a reddish-brown coloration, dyeing cotton from a brown hydrosulfite vat yellowish-olive shades of good fastness properties.

3. The product of the probable formula:

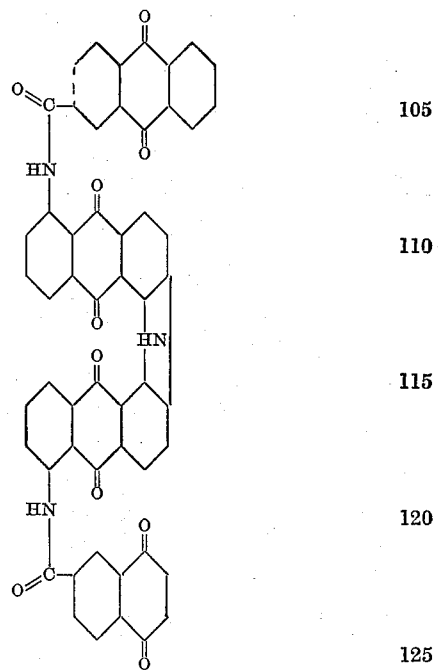

said product forming an orange-yellow powder, dissolving in boiling quinoline with the same coloration, in strong sulfuric acid with a blue coloration and dyeing cotton from a brown hydrosulfite vat orange-yellow shades of good fastness properties.

4. The product of the probable formula:

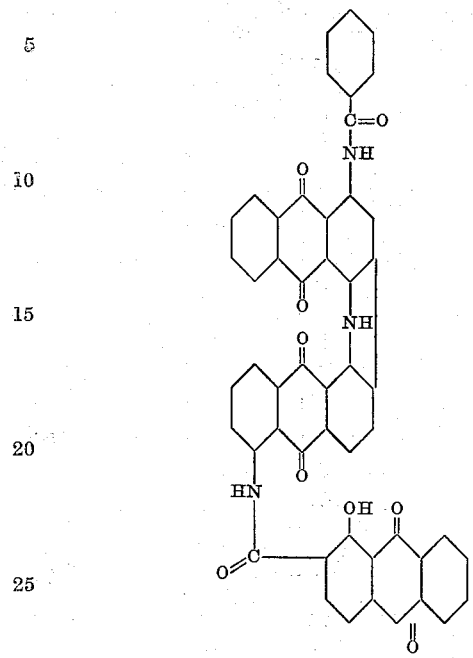

said product forming a brown powder, dissolving in hot quinoline with a brown coloration, in sulfuric acid of 96% strength with a reddish-brown coloration and dyeing cotton from a brown hydrosulfite vat brown shades.

In testimony whereof, I affix my signature.

FRITZ BAUMANN.

Certificate of Correction

Patent No. 1,819,014. Granted August 18, 1931, to

FRITZ BAUMANN

It is hereby certified that error appears in the printed specification of the above-numbered patent requiring correction as follows: Page 3, between lines 101 to 125, claim 3, strike out the formula and insert instead

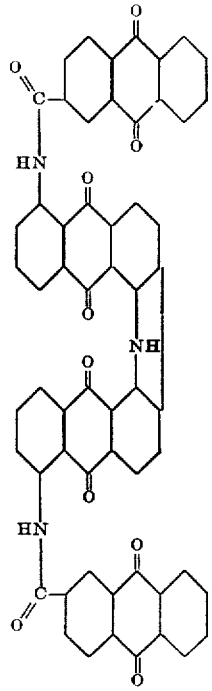

and that the said Letters Patent should be read with this correction therein that the same may conform to the record of the case in the Patent Office.

Signed and sealed this 20th day of October, A. D. 1931.

[SEAL.]

M. J. MOORE,
*Acting Commissioner of Patents.*